(12) United States Patent  (10) Patent No.: US 8,113,345 B2
Jensen et al.  (45) Date of Patent: Feb. 14, 2012

(54) MEDIA PACKAGING

(76) Inventors: Tron Jensen, Bergen (NO); William Mort, Loddefjord (NO)

( * ) Notice: Subject to any disclaimer, the term of this patent is extended or adjusted under 35 U.S.C. 154(b) by 20 days.

(21) Appl. No.: 12/517,809

(22) PCT Filed: Dec. 12, 2007

(86) PCT No.: PCT/NO2007/000441
§ 371 (c)(1),
(2), (4) Date: Sep. 3, 2009

(87) PCT Pub. No.: WO2008/072977
PCT Pub. Date: Jun. 19, 2008

(65) Prior Publication Data
US 2010/0307937 A1 Dec. 9, 2010

Related U.S. Application Data

(60) Provisional application No. 60/869,913, filed on Dec. 14, 2006.

(51) Int. Cl.
B65D 85/57 (2006.01)
B65D 5/00 (2006.01)
(52) U.S. Cl. .................................. 206/308.1; 206/312
(58) Field of Classification Search .............. 206/308.1, 206/307, 308.2, 303, 232, 311, 312, 784
See application file for complete search history.

(56) References Cited

U.S. PATENT DOCUMENTS

| | | | | |
|---|---|---|---|---|
| 4,709,812 A | * | 12/1987 | Kosterka | 206/308.1 |
| 4,905,831 A | * | 3/1990 | Bagdis et al. | 206/308.3 |
| 5,188,229 A | | 2/1993 | Bernstein | |
| 5,289,918 A | | 3/1994 | Dobias et al. | |
| 5,419,433 A | * | 5/1995 | Harrer et al. | 206/313 |
| 5,421,453 A | * | 6/1995 | Harrer et al. | 206/312 |
| 5,518,488 A | * | 5/1996 | Schluger | 493/82 |
| 5,647,482 A | * | 7/1997 | Kleinfelder | 206/308.1 |
| 5,749,463 A | * | 5/1998 | Collins | 206/308.1 |
| 5,769,216 A | | 6/1998 | Collins | |
| 5,772,022 A | * | 6/1998 | Renna | 206/312 |
| 6,073,763 A | | 6/2000 | Collins | |
| 2008/0135430 A1 | * | 6/2008 | Fitzsimons | 206/308.1 |

FOREIGN PATENT DOCUMENTS

JP 9-221187 9/1997
JP 3724756 12/2005

* cited by examiner

Primary Examiner — Steven A. Reynolds
(74) Attorney, Agent, or Firm — Christian D. Abel

(57) ABSTRACT

A compact disk package, printable on a single paper board blank. The printed package is foldable into at least three sections, namely a front section, a back section connected to the front section along a common, foldable side edge and a CD-holding section attached to the top edge of the back section by a foldable flap. The CD-holding section according to one aspect of the invention is generally square shaped, with a width greater than the diameter of the CD. Two curved slits are cut into the CD-holding section, the arc of the slits corresponding to the curvature of the CD.

12 Claims, 7 Drawing Sheets

MEDIA PACKAGING

FIELD OF THE INVENTION

The present invention relates to holders for a recording medium, more particularly for a package for holding a planar disc such as a compact disc, DVD or the like.

BACKGROUND OF THE INVENTION

Various types of planar disks are used to record digital and analogue information. Among these are CD's and DVD's which often contain entertainment content such as music or films. These discs are typically packaged in a holder that functions to both protect the disc, and to provide an attractive display at the point of sale. The most common package is the hinged, transparent plastic case known as the "Jewel Case". The jewel case comprises a hub with bendable fingers that engage the center hole of the disc to hold it securely in place. Even though widely accepted, the jewel case has several disadvantages, among them the cost of production, and the fact that plastic is an environmentally unfriendly material.

As a result a number of attempts have been made to provide a CD package made of a more environmentally friendly material such as paper board, preferably a package that can be printed from a single blank. Among such prior art packages include U.S. Pat. Nos. 6,681,928; 5,931,293 and 6,375,003. While these devices address certain disadvantages of the jewel case, the devices themselves have many disadvantages. U.S. Pat. Nos. 6,681,928; 5,931,293 disclose a paper blank cut and folded to comprise a pouch for holding the CD. Such a pouch does not hold the CD securely, however. In addition, the CD, which may itself have important information printed on it, is obscured inside the pouch. The device described in U.S. Pat. No. 6,375,003 does not employ a pouch, but rather holding means that engage the center hole of the CD. While this solution allows the CD to be visible, the CD is not held particularly securely.

There exists a need, therefore, for a CD package that may be printed from a single paper board blank of for example recycled paper, that is simple to produce, that holds the CD securely, and that allows the CD itself to be visible inside the packaging.

SUMMARY OF THE INVENTION

The present invention provides a compact disk package printable on a single paper board blank. The printed package is foldable into at least three sections, namely a front section, a back section connected to the front section along a common, foldable side edge and a CD-holding section attached to the top edge of the back section by a foldable flap. The CD-holding section according to one aspect of the invention is generally square shaped, with a width greater than the diameter of the CD. Two curved slits are cut into the CD-holding section, the arc of the slits corresponding to the curvature of the CD. The slits do not extend to the edges of the CD-holding section, and thereby create two hinge-like tabs at the terminal ends of each slit, allowing the sides of the CD-holding section to define two foldable retaining members that can be folded in towards each other in a fashion resembling double doors. Because of the slits, these "door like" retaining members will have a concave inside edge, extending from one hinge-like tab to the other. A CD may then be inserted into the slits, the two retaining members folded over the CD and the front section folded along its common edge with the back section, thus closing the package. When the package is opened, the retaining members that have been folded over the CD will open slightly, but not fully. The concave inside edges of the retaining members will thus securely hold the edges of the CD that have been inserted into the slits. The CD is held surprisingly securely, and in fact the package can be vigorously waved around without the CD falling out. The door-like retaining members of the CD-holding section can easily be opened to reveal the information printed on the CD, and the CD is very easily removed from the slits despite how securely it held in place.

BRIEF DESCRIPTION OF THE DRAWING

The invention will now be described in detail, with reference to the attached figures, wherein.

DETAILED DESCRIPTION OF THE INVENTION

Figure 1:
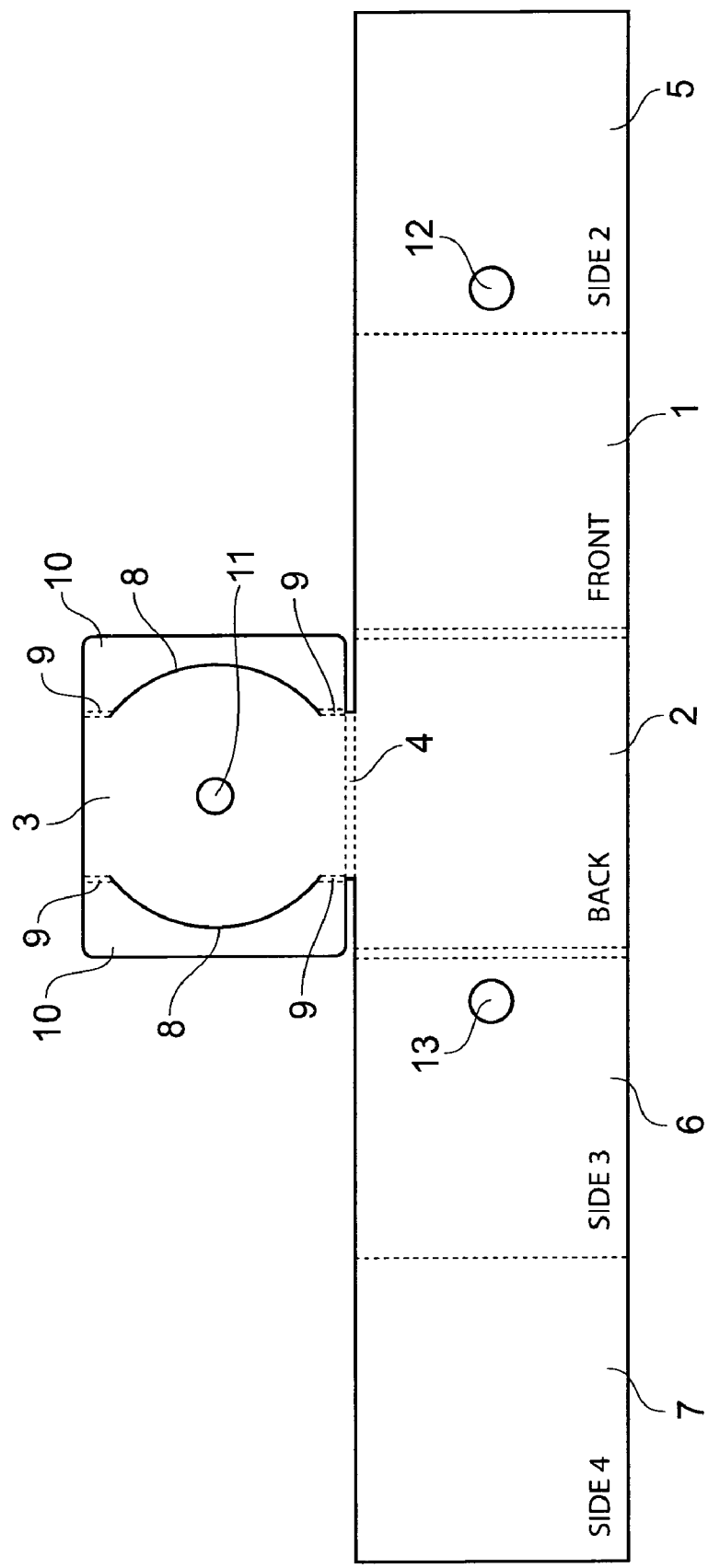
FIG. 1 is a top view of a preferred embodiment of the CD package of the invention as printed on a single blank.
Figure 2:
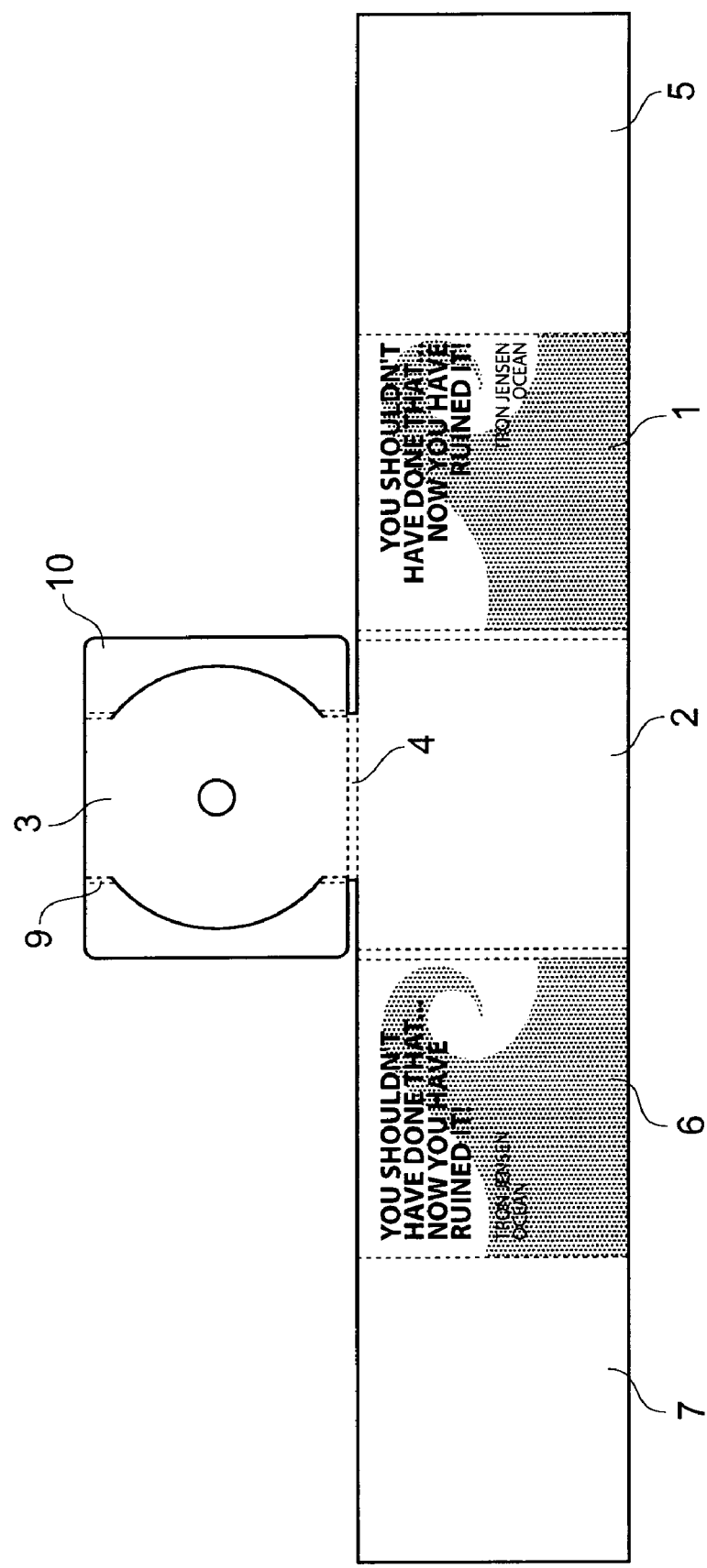
FIG. 2 is a similar view as FIG. 1, but showing an example of cover art and disc contents for a music CD printed on the blank.
Figure 3:
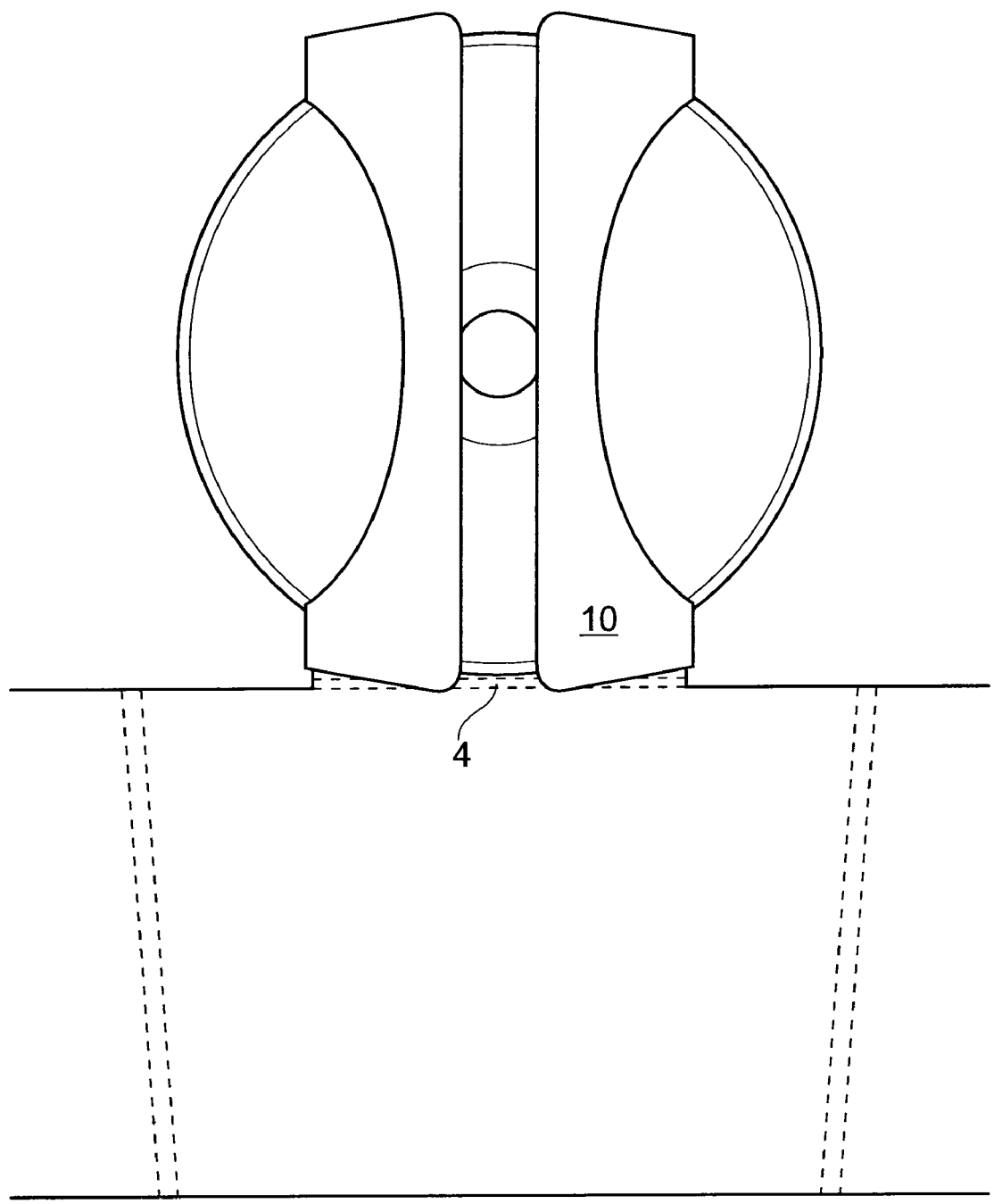
FIG. 3 is a top view of the package according to the invention, with a CD inserted into the CD-holding section and the door-like retaining members folded over the CD.
Figure 4:
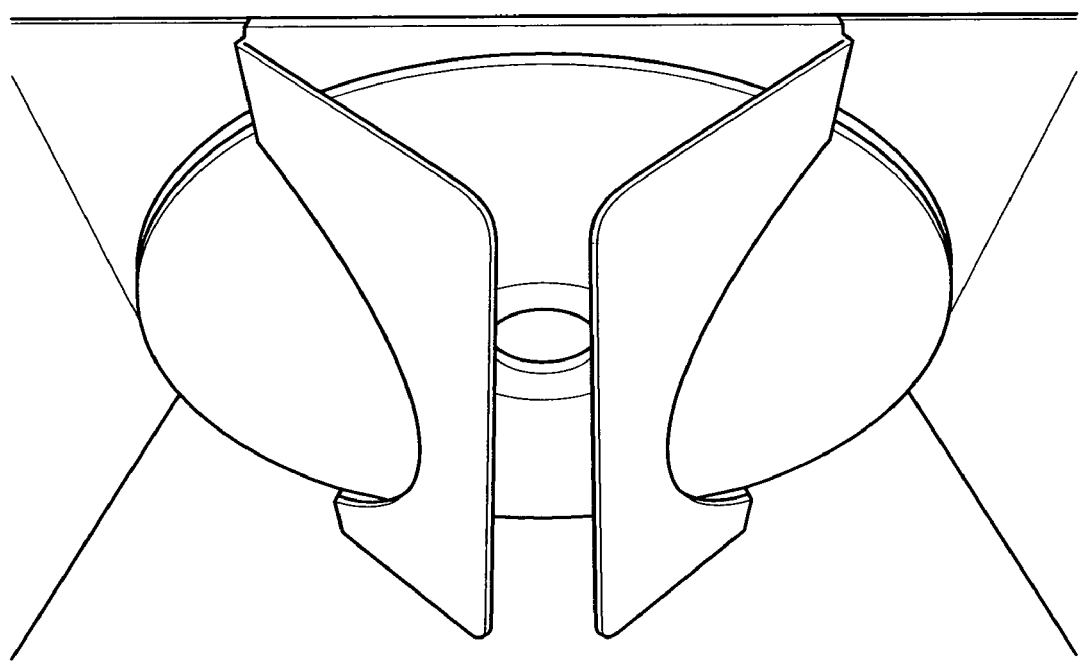
FIGS. 4-7 are perspective views of a preferred embodiment of the CD package according to the invention.

As shown in FIGS. 1 and 2, a preferred embodiment of the CD package according to the invention may be printed on a single blank of paper board, for example using recycled paper. Referring to FIG. 1, the solid lines represent cut lines, and the dashed lines represent folds.

The CD package comprises a front section 1 adjacent a back section 2 along a common, foldable edge. A CD-holding section 3 is attached to back section 2 by a foldable flap 4, that has a length shorter than the widths of back section 2 and CD-holding section 3. In a preferred embodiment, a "side 2" section is adjacent front section 1 along a common foldable edge, a "side 3" section is adjacent back section 2 along a common foldable edge, and a "side 4" section is adjacent the "side 3" section along a common foldable edge. As can be appreciated from FIG. 2, side 2 can be folded back onto the front section to increase the overall thickness, as well as providing an additional page for printed information. Likewise, side 4 can be folded back onto side 3, which in turn can be folded into the interior of the package when the package is closed by folding the front section onto the back section. FIGS. 1 and 2 show the front, back and sides 2-4 being arranged horizontally, however side 2 could be arranged along the top edge of front section 1, and side 4 could be arranged along the top edge of side 3. In a preferred embodiment, each of the aforementioned sections are generally square, and have a width greater than the diameter of the CD.

Figure 5:
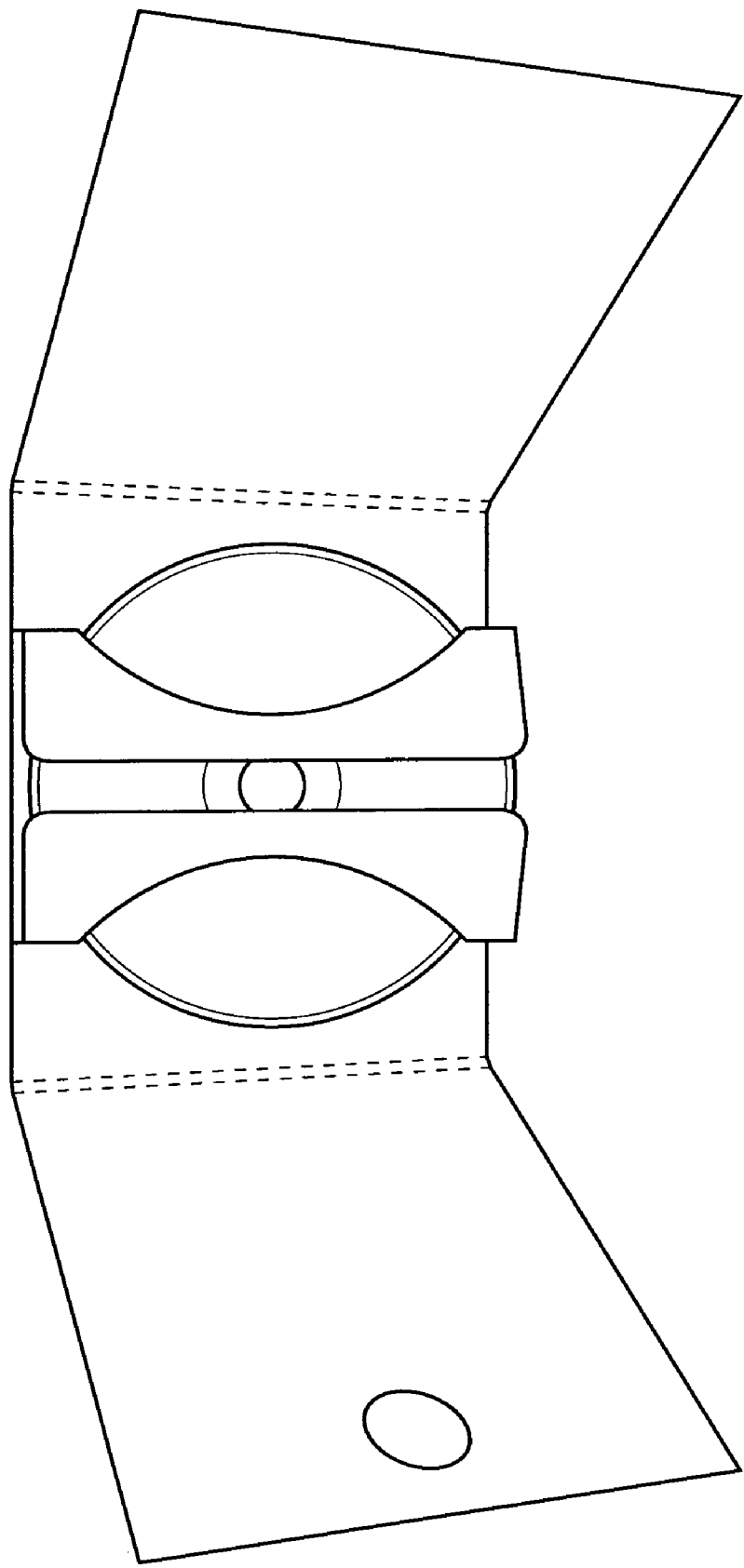
Figure 6:
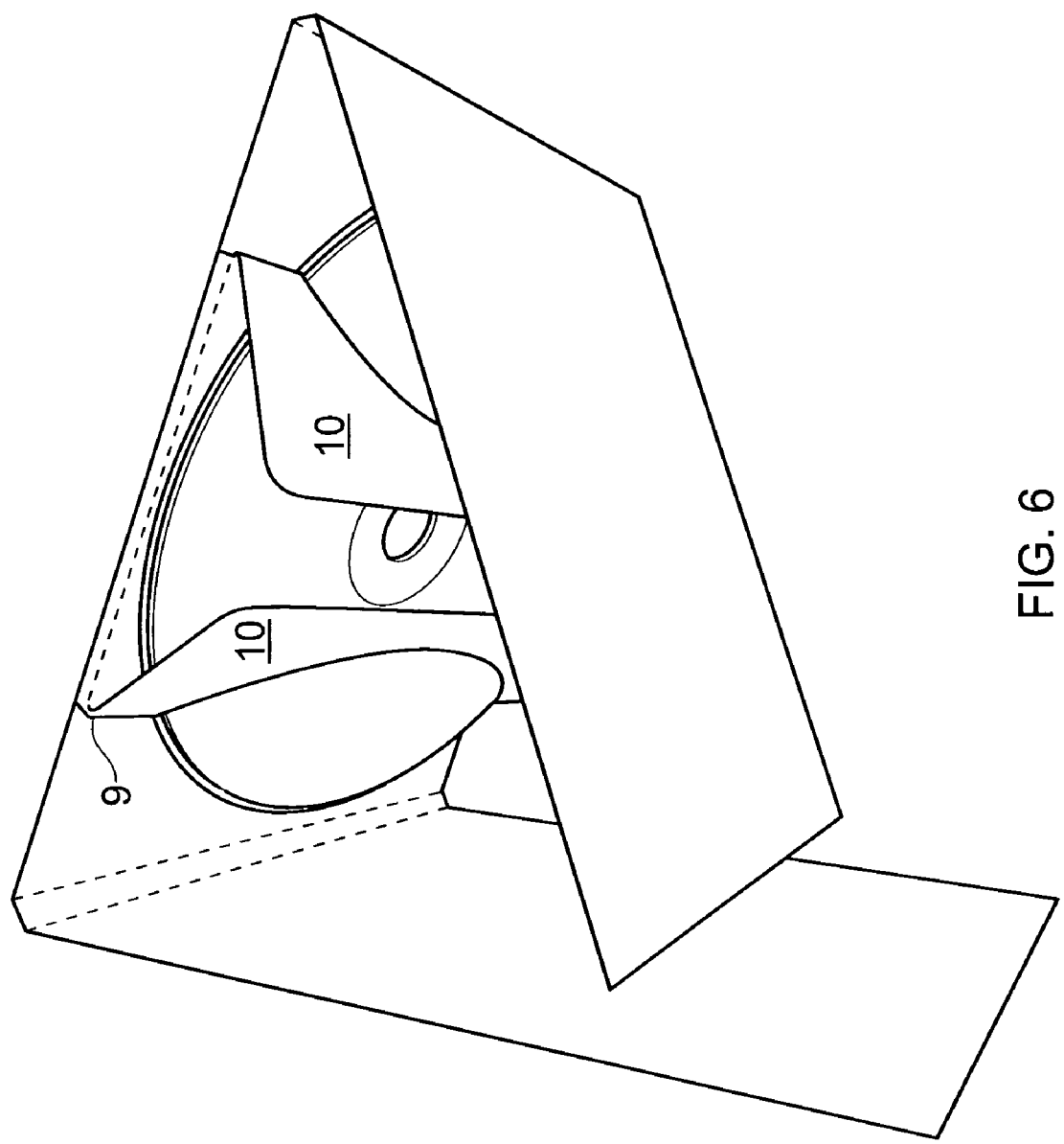

As shown in FIG. 1, two curved slits 8 are cut into CD-holding section 3. The slits do not extend to the edges, and as a result form two sets of hinge-like tabs 9. As shown in FIG. 5, the curved slits 8 are cut so as to correspond to the curvature of the CD. As a result of cutting the curved slits 8, two "door like" retaining members 10 having concave inner edges are formed that are rotatable around tabs 9.

In use, a single blank is printed as depicted in FIG. 2, with various cover art or other information in the appropriate sections. The blank is cut out along the solid lines and folded along the dashed lines to from the CD package. A hole 11 may optionally be cut in CD-holding section 3, and two holes 12 and 13 cut into sides 2 and 3 respectively. After having been cut out, side 2 is folded over onto the front section and glued, side 4 is folded over onto side 3 and glued, slits 8 are cut into CD-holding section 3 and the retaining members 10 prefolded along tabs 9. CD-holding section 3 is also folded along flap 4 so that CD-holding section 3 can lay against back section 2.

As can be ascertained by FIGS. 4-7, a CD is inserted into slits 8, and retaining members 10 thereafter folded in towards each other holding the CD in place. Sides 3/4 are folded inwards, and thereafter the front section is folded shut. In a preferred embodiment complimentary patches of a hook-and-loop fastener may be affixed into holes 12 and 13, which will engage each other and hold the CD package closed when folded shut.

Figure 7:
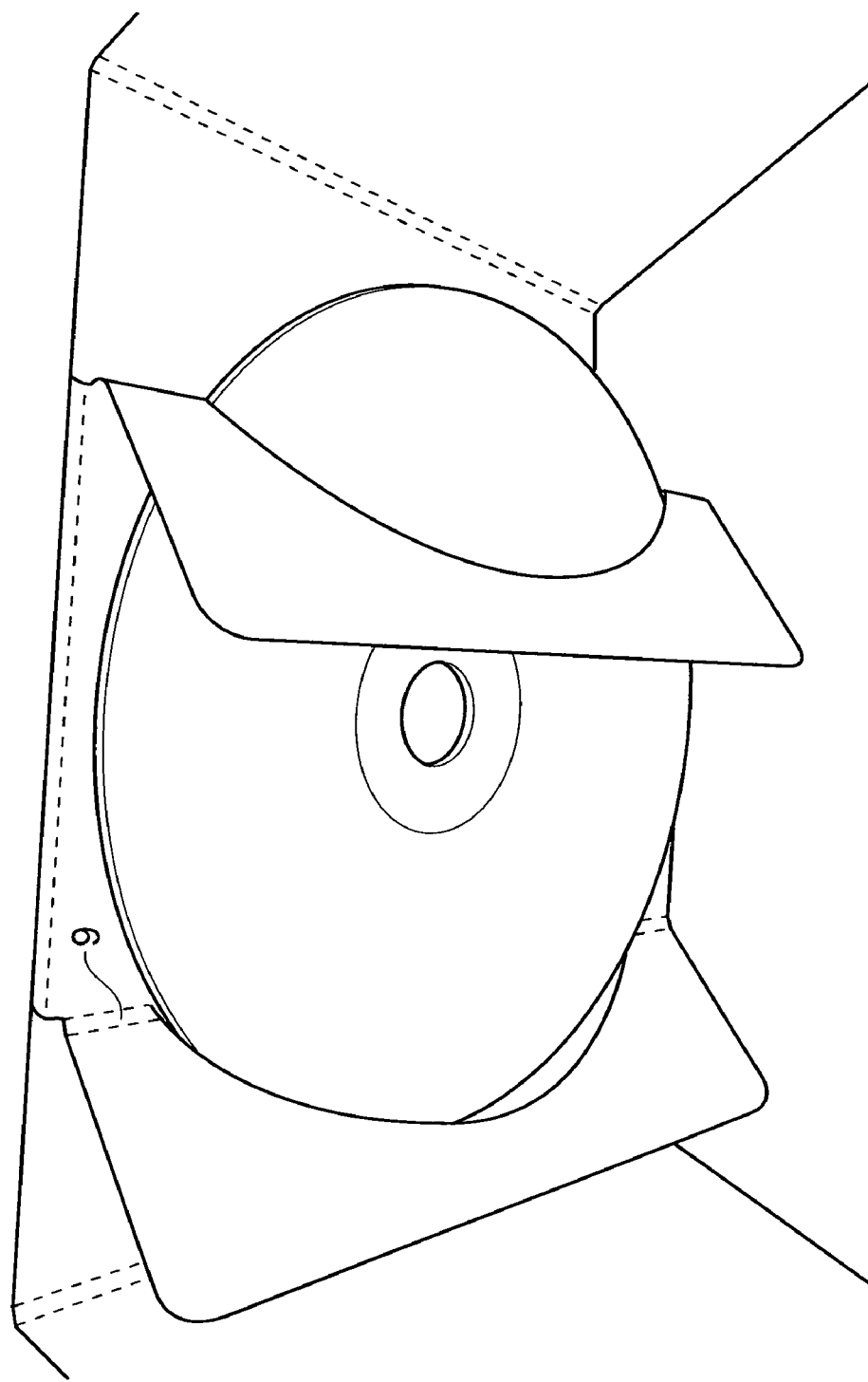

When the package is opened, the retaining members 10 will open slightly, but not fully as shown in FIG. 7. The CD will be remain securely in place however by virtue of the fact that the edges of the CD extend past the concave inner edges of retaining members 10.

The invention claimed is:

1. A package for a planar disc recording medium, comprising at least a back section (2), a front section (1) attached to the back section (2) along a first common foldable edge and a disc-holding section (3) attached to the back section (2) along a second common foldable edge, wherein the disc-holding section (3) has approximately the same lateral width as the back section and a width greater than the diameter of the disc and comprises two symmetrical slits (8) arranged for receiving and retaining the disc, characterized in that the slits (8) are curved, having arcs the imaginary extensions of which would connect and complete a circle with essentially the same diameter as the recording medium, said slits (8) further being arranged in the disc-holding section (3) so as to form upper and lower foldable tabs (9) extending from slits (8) to upper and lower edges respectively of the disc-holding section (3) thus forming foldable retaining portions (10), the axis of folding of which is perpendicular to the axis of folding of the second common foldable edge between the back section (2) and the disc-holding section (3), said second common foldable edge having a lateral width less than that of the disc holding/back sections, whereby the retaining portions (10) can be folded back over onto and thus securely retain the recording medium.

2. A package according to claim 1, wherein said package is cut from a single, paper board blank.

3. A package according to claim 2, wherein the back section (2), front section (1) and disc-holding sections (3) are generally square-shaped.

4. A package according to claim 3, wherein the front section (1) is attached to the back section (2) along a side edge, and the disk-holding section (3) is attached to a top edge of the back section (2).

5. A package according to claim 4, wherein the disk-holding section (3) is attached to the back section (2) by a foldable tab (4) having a width less than the width of the top edge.

6. A package according to claim 4, further comprising a first additional section (5) attached adjacent to the front section (1) along a common foldable edge, a second additional section (6) attached adjacent to the back section (2) along a common foldable edge, and a third additional section (7) attached adjacent to the second additional section (6) along a common foldable edge.

7. A package according to claim 6, wherein the first additional section (5) is folded over and glued to the front section (1), the third additional section (7) is folded over and glued to the second additional section (6), the disc-holding section (3) is folded over onto the back section (2), and whereby the package is arranged such that a disc may be inserted into the slits (8), the retaining portions (10) folded along foldable tabs (9) formed by the slits (8) and folded over the disc, the second additional section (6) folded over the disk holding section (3) and the front section (1) folded over the second additional section (6), thus forming a closable package.

8. A method for making a package for a planar disc, comprising providing a single paper board blank, onto which is executed a predefined pattern of cuts along cut lines and folds along fold lines, the cut lines defining a back section (2), a front section (1) adjacent to the back section (2) along a first common fold line and a disc-holding section (3) having approximately the same lateral width as the back section (2), said disc holding section further being adjacent to the back section (2) along a second common fold line, said second common foldable line having a lateral width less than the widths of the disc holding/back sections, wherein two slits (8) in the form of symmetrical arcs are cut into the disc-holding section (3), the slits (8) being arranged such that an imaginary extension of the arc of the slits (8) would complete a circle having a diameter essentially equal to the diameter of the planar disc, the slits (8) further forming upper and lower foldable tabs (9) in the material of the disc-holding section, thus forming foldable retaining portions (10) that can be folded back over the planar disc, the fold lines of the tabs (9) being perpendicular to the fold line between the back section (2) and the disc-holding section (3).

9. A method according to claim 8, wherein the back section (2), front section (1) and disc-holding sections (3) are generally rectangular, with a width greater than the diameter of the disc and wherein the blank is cut such that the common fold line between the back section (2) and the disc-holding section (3) defines a foldable connecting tab (4) between the two that is narrower than the width of the disc-holding section (3).

10. A method according to claim 8, wherein the front section (1) is arranged adjacent to the back section (2) along a side edge, and the disk-holding section (3) is arranged adjacent to the back section (2) along the top edge of the back section (2).

11. A method according to claim 9, wherein the packaging is arranged for retention of a disk containing recorded information, and that printed information regarding the content is printed on at least the front, back or disc-holding sections.

12. A method according to claim 10, wherein the paper board is made of recycled material.

* * * * *